(12) United States Patent
Becker et al.

(10) Patent No.: US 7,775,592 B2
(45) Date of Patent: Aug. 17, 2010

(54) SEAT FRAME OF A MOTOR VEHICLE SEAT WITH A SEAT CARRIER HAVING TWO SIDE PARTS

(75) Inventors: Burckhard Becker, Solingen (DE); Wilfried Beneker, Leichlingen (DE)

(73) Assignee: C. Rob. Hammerstein GmbH & Co. KG, Solingen (DE)

( * ) Notice: Subject to any disclaimer, the term of this patent is extended or adjusted under 35 U.S.C. 154(b) by 0 days.

(21) Appl. No.: 12/023,101

(22) Filed: Jan. 31, 2008

(65) Prior Publication Data
US 2008/0179932 A1 Jul. 31, 2008

(30) Foreign Application Priority Data
Jan. 31, 2007 (DE) ........................ 10 2007 005 729
Oct. 18, 2007 (DE) ........................ 10 2007 049 864

(51) Int. Cl.
*B60N 2/10* (2006.01)
(52) U.S. Cl. .................. 297/344.17; 297/330
(58) Field of Classification Search ............ 297/284.11, 297/284.7, 312, 330, 311, 313, 337, 344.15, 297/344.17
See application file for complete search history.

(56) References Cited

U.S. PATENT DOCUMENTS

| | | | | |
|---|---|---|---|---|
| 4,334,709 A * | 6/1982 | Akiyama et al. | ........ | 297/284.11 |
| 4,880,199 A * | 11/1989 | Harney | ........................ | 248/396 |
| 6,119,980 A * | 9/2000 | Ferry | ........................ | 244/122 R |
| 6,129,420 A * | 10/2000 | Judic | ........................ | 297/330 |
| 6,213,554 B1 * | 4/2001 | Marcoux et al. | ............. | 297/330 |
| 6,386,631 B1 * | 5/2002 | Masuda et al. | ........... | 297/216.1 |
| 6,402,244 B1 * | 6/2002 | Schonenberg et al. | .. | 297/284.11 |
| 6,481,796 B1 * | 11/2002 | Chen | ........................ | 297/329 |
| 6,517,157 B1 * | 2/2003 | Vorac | .................... | 297/344.13 |
| 6,578,920 B2 * | 6/2003 | Delmas et al. | ......... | 297/344.17 |
| 6,604,791 B1 * | 8/2003 | Chen | ........................ | 297/330 |
| 6,837,540 B2 * | 1/2005 | Yamaguchi et al. | ...... | 297/216.1 |
| 6,843,460 B2 * | 1/2005 | Koga et al. | ................... | 248/421 |
| 6,921,058 B2 * | 7/2005 | Becker et al. | ............... | 248/419 |
| 6,974,186 B1 * | 12/2005 | Chang | ......................... | 297/68 |
| 7,104,601 B2 * | 9/2006 | Masuda et al. | ........... | 297/216.1 |
| 2001/0004164 A1 * | 6/2001 | Mattsson | ............... | 297/284.11 |
| 2001/0022460 A1 * | 9/2001 | Kondo et al. | ........... | 297/284.11 |
| 2004/0066072 A1 * | 4/2004 | Trippensee et al. | ........ | 297/330 |
| 2006/0197363 A1 * | 9/2006 | Lofy et al. | ............. | 297/180.13 |
| 2006/0290184 A1 * | 12/2006 | Stoneman et al. | ........... | 297/330 |

* cited by examiner

Primary Examiner—Peter R. Brown
(74) Attorney, Agent, or Firm—McCarter & English, LLP

(57) ABSTRACT

The invention relates to a seat frame of a motor vehicle seat with a seat carrier having two side parts that are oriented transverse to a front axis and to a rear axis, a pivotal bridge being pivotal about at least one of said axes, said bridge comprising a tie bar and two side arms, and with an adjustment device having a motor-driven drive unit. The drive unit is arranged for pivotal movement about a hinge shaft that is substantially centered on that axis of the two axes about which said pivotal bridge is pivotal. Said hinge shaft is shorter than the distance between the two seat parts and is not in contact with said two seat parts, but if at all with only one side part. There is provided at least one inner arm that connects said tie bar to said hinge shaft and is located in proximity to said drive unit.

15 Claims, 1 Drawing Sheet

SEAT FRAME OF A MOTOR VEHICLE SEAT WITH A SEAT CARRIER HAVING TWO SIDE PARTS

CROSS REFERENCE TO RELATED APPLICATIONS

This application claims priority to German Application Nos. DE 10 2007 005 729.8, filed Jan. 31, 2007 and DE 10 2007 049 864.2, filed Oct. 18, 2007, both of which are hereby incorporated by reference in their entireties as part of the present disclosure.

BACKGROUND OF THE INVENTION

The invention relates to a seat frame of a motor vehicle seat with a seat carrier having two side parts that are oriented with respect to each other along a front axis and along a rear axis, a pivotal bridge being pivotal about at least one of said axes, said bridge comprising a tie bar and two side arms, and with a first adjustment device having a motor-driven drive unit.

In general, seat frames must offer sufficient stability and, in their quality of integrated seats, must also be capable of taking belt forces. Further, they must also be of the smallest dimensions possible and offer sufficient space for additional equipment features such as, for example, additional adjustment devices, lordose support, massage functions such as vibrating functions, etc.

A primary problem of the seat frames of the type mentioned herein above is that reaction forces of the first adjustment device act upon the side parts, affecting at least one side part. This side part is not only loaded in its longitudinal direction, meaning in the connection line of the pierce points of the two axes, but also in the y direction. The side parts deform in the y direction, bulging for example outward or inward.

It is an object of the present invention to indicate a seat frame in which the at least one adjustment device introduces as far as practicable few bending moments into the side parts. Another object of the invention is to utilize solid components of the seat frame, for example a pivotal bridge, better than before in order to achieve stability of the entire seat frame and to thereby assign to these parts functions they did not have hitherto.

Accordingly, it is the object of the invention to further develop the seat frame of the type mentioned herein above in such a manner that reaction forces of the first adjustment device will cause least possible bending moments to occur in the side parts and that, in addition thereto, there is more space available for other component parts between the side parts than before.

SUMMARY OF THE INVENTION

The invention is directed to a motor vehicle seat comprising a seat carrier including two side parts that are oriented with respect to each other along a front axis and along a rear axis, and a pivotal bridge being pivotal about at least one of said front and rear axes, said bridge comprising a tie bar and two side arms. The seat further comprises a first adjustment device including a motor-driven drive unit arranged for pivotal movement about a hinge shaft that is substantially centered on that axis of the front and rear axes, about which said pivotal bridge is pivotal, and at least one inner arm that connects said tie bar to said hinge shaft and is located in proximity to said drive unit. The hinge shaft is shorter than the distance between the two side parts and at least one of (i) the hinge shaft does not contact the two side parts and (ii) the hinge shaft contacts one of the side parts.

In one aspect the two side parts are oriented transverse to the front axis and to the rear axis. Further, the drive unit is arranged for pivotal movement about a hinge shaft that is substantially centered on one of the two axes.

On this seat frame, the hinge shaft does not extend from the one side part to the other but only over part of the length of the respective axis, meaning of the front axis or the rear axis. As a result, there remains a free space between the hinge shaft and one of the two side parts. This free space may be used for other component parts.

The hinge shaft, the inner arm, a portion of the tie bar and either another inner arm or one of the two side arms form a solid supporting four-bar linkage. Said four-bar linkage receives the tensile and compressive forces of the drive unit. As a result, the side parts are substantially tension or pressure biased. The hinge shaft is prevented from pivoting with respect to the side parts. The high rigidity of the tie bar, which it has to have inherently anyway for its purpose of utilization, is advantageously further used for the adjusting forces of the first adjustment device.

Preferably, the hinge shaft pivots exactly about the respective one of the axes to which it is associated, meaning about the front or the rear axis. As a result, the respective pivot position of the pivotal bridge does not influence the position of the drive unit. Accordingly, adjustment of the pivotal bridge will not influence adjustment of the first adjustment device. It is however possible to couple the adjustment of the pivotal bridge to the first adjustment device if the hinge shaft is not centered on the respective one of the axes. Then, adjustment of the pivotal bridge affects more or less the position of the seat part which is associated to the first adjustment device.

Preferably, the first adjustment device is a height adjustment of the seat or an adjustment device for adjusting the incline of the back rest.

Other features and advantages will become more apparent upon reviewing the appended claims and the following non restrictive description of embodiments of the invention, given by way of example only with reference to the drawings.

DETAILED DESCRIPTION

Figure 1:
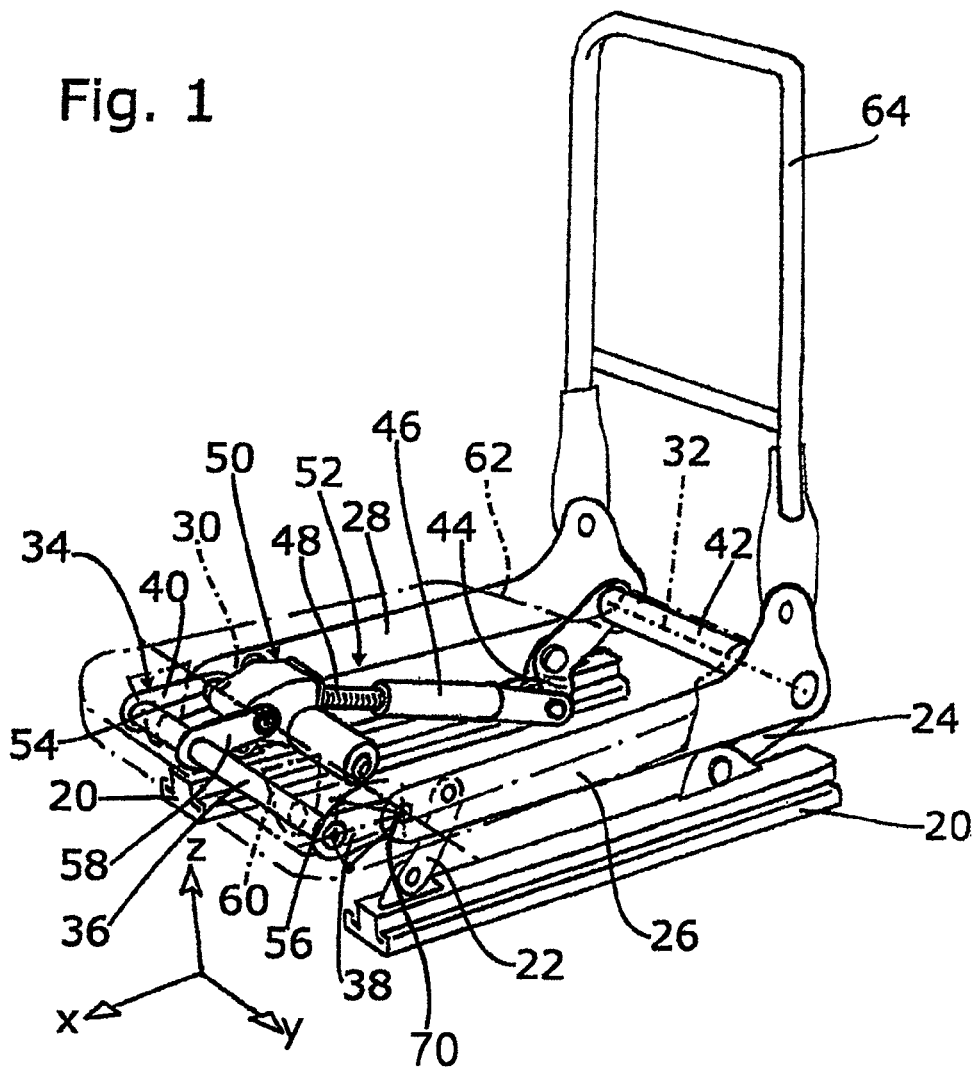
FIG. 1: is a perspective illustration of a seat frame with outlined seat padding.

The seat frame as shown in FIG. 1 comprises an underframe with a left pair of rails and a right pair of rails 20, front left and right pivoting supports 22 and rear left and right pivoting supports 24. These pivoting supports 22 and 24 carry a seat carrier articulated thereon, said seat carrier having two side parts, namely a left side part 26 and a right side part 28. Between these side parts (or seat parts) 26 and 28, a front axis 30 and a rear axis 32 extend. The side parts 26 and 28 extend substantially in the x direction. They are stamped steel sheet parts that are formed, for example, in the shape of a tub.

A pivotal bridge 34 is adapted for pivotal movement about the front axis 30; it has a tie bar 36 in the shape of a tube, a left side arm 38 and a right side arm 40. Said arms are connected to the two side parts 26 and 28 in hinged areas for pivotal movement about the front axis 30. In the rear region of the seat frame, there is provided a transverse tube 42 that is arranged centrally with respect to the rear axis 32 and is pivotal thereabout. It is solidly connected to the two rear pivotal supports 24. The right rear pivotal support 24 has a projection 44. Said projection belongs to a first adjustment device. On said projection 44, there is articulated a holding means of a spindle nut 46 that engages a spindle 48. Said spindle is rotated by a gear motor 50 that comprises an electric motor with a reduction gear flanged thereon. The holding means, the spindle nut 46, the spindle 48 and the gear motor 50 form a drive unit 52. Said drive unit is pivotal about a hinge shaft 54 that is centered on the front axis 30; concretely, the gear housing is pivotal about said hinge shaft 54 or pivots together therewith about the axis 30. At the rear end, the drive unit 52 is hinged to the projection 44. In a known way, the distance between these two hinge points may be varied by operating the electric motor. In the embodiment shown, the angular position of the two rear pivotal supports 24 changes as a result thereof, with the two front pivotal supports 22 also changing. Accordingly, the height of the seat pan 62 is adjusted.

The hinge shaft 54 extends over a short part of the length of the front axis 30 only, for example over less than half, preferably less than third, of said length. It projects from the right side part 26 and is connected therewith, either hingedly or fixedly. Between its free end and the left side part 26, there remains a free space 56 that can be used for component parts, for example for the motor of the drive unit 50.

The gear of the gear motor 52 is located in immediate proximity to the right side arm 40. At the same distance but on the other side, there is located an inner arm 58 which, in the exemplary embodiment shown herein, is built identically to the two also identically built side arms 38 and 40. They must not be built identically though. The clear distance between the right side arm 40 and the inner arm 58 is hardly greater, for example some millimetres greater, than the corresponding dimension of the gear motor 50. Together with a portion of the tie bar 36 and the hinge shaft 54, the two arms 40 and 58 form a supporting four-bar linkage. For increase of its stability, it is advantageous to have the two arms 40 and 58 solidly connected to the hinge shaft 54. Through the inner arm 58, it is achieved that the hinge shaft 54 is also supported at its inner end. As a result, it is better fixed than without such an inner arm 58 that abuts the tie bar 36. Bending moments that could be introduced in the associated side part 36 are thus avoided.

As shown in FIG. 1, supports 60 drawn in dash-dot lines and carrying the front part of a seat pan 62 are connected to the tie bar 36. The back part of the seat pan 62 rests on the transverse tube 42. The height adjustment of the seat pan, which is possible through pivotal movement of the pivotal bridge 34 in the given angular range shown in FIG. 1, is associated to a hand- or motor-driven adjustment device 70 that has not been illustrated in detail herein and is known from prior art. An adjustment of the pivotal bridge 34 has no influence on the position of the motor-driven drive unit 52. Through the tie bar 36, adjustment forces of the motor-driven drive unit 52 are also transmitted to the left side part 26.

In one embodiment, the spindle 48 extends substantially parallel to the elongated side parts 26 and 28, and in one aspect, is inclined thereto at an angle less than or equal to about 20°. In some embodiments, spindle 48 is inclined at an angle less than about 10°. Due to the small angle, the distance between the side parts and the underside of the pairs of rails 20 is small also, so that the seat has a flat construction.

The seat frame shown in FIG. 1 also has a back rest 64. It is hinged to the side parts 26 and 28. In an alternative, the back rest 64 has, like the rear right pivotal support 24, a projection projecting downward at which the spindle nut 46 is hinged in the alternative described. Then, the incline adjustment of the back rest 64 is adjusted via the motor-driven driving unit 52.

Typically, in one end region, for example the front end region as shown in FIG. 1, the two side parts 26 and 28 are not directly mechanically connected along the front axis 30, but via the pivotal bridge 34; otherwise, the arrangement would have no hold. In particular the left side arm 38 of the seat construction in FIG. 1 would have no lateral hold.

In another embodiment, the end region of the motor-driven drive unit 52, preferably the drive motor 50, is disposed in a supporting four-bar linkage that is composed of two arms 38 and 40, one portion of a tie bar 36 and a hinge shaft 54.

Figure 2:
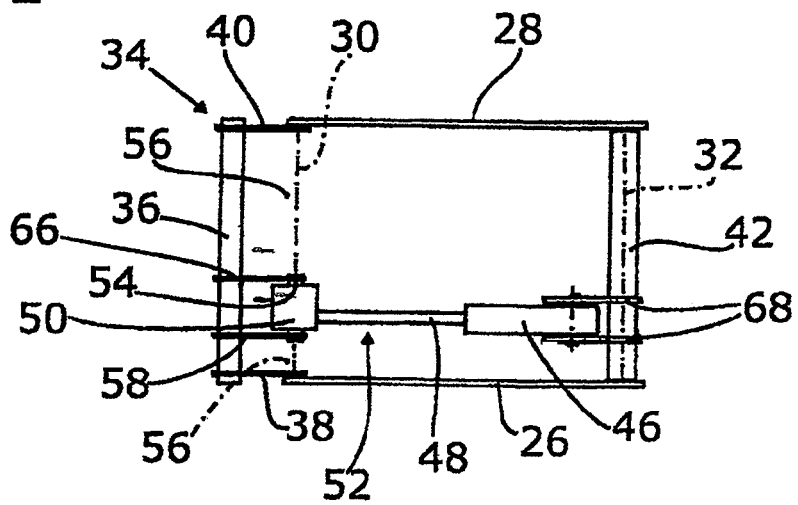
FIG. 2: is a top view in the z direction of a seat frame in a second configuration, but now shown without underframe and without back rest.

In the embodiment shown in FIG. 2, the hinge shaft 54 has no contact with any of the two side parts 26 and 28. The inner arm 58 and an additional inner arm 66 project from the tie bar 36 in the direction of the front axis 30. They carry the hinge shaft 54 that is connected thereto and is centered on the front axis 30. Otherwise, the pivotal bridge 34 is configured as shown FIG. 1.

In the rear region of the seat frame, two rear arms 68 are non-rotatably connected to the transverse tube 42. Depending on the angular position, the rotation position of the transverse tube 42 changes, the angular position in turn depends on the length of the motor-driven drive unit 52, which in turn is equipped with a spindle 48. It is also possible to arrange the drive unit 52 the other way round, meaning to position the spindle nut 46 on the hinge shaft 54 and to dispose the gear motor 50 at the back.

Together with a portion of the transverse tube 42 and a rear pivotal shaft, the two rear arms 68 form a second supporting four-bar linkage. In this way, transverse forces, which could lead to bending moments in at least one of the two side parts 26 and 28, are prevented from occurring in the rear region.

What is claimed is:

1. A seat frame of a motor vehicle seat comprising:
   a seat carrier including two side parts that are oriented transverse to a front axis and to a rear axis, a front part, and a rear part;
   a back rest hinged to said side parts;
   a pivotal bridge being pivotal about one of said front and rear axes, said bridge comprising a tie bar and two side arms, said bridge further being one of i) pivotal about said front axis and comprising said front part and ii) pivotal about said rear axis and comprising said rear part;
   a transverse tube being arranged centrally with respect to the other one of said front and rear axes and is pivotal about said other axis;
   at least one pivotal support having a projection, the transverse tube being solidly connected to the at least one pivotal support; and
   an adjustment device including
      a motor-driven drive unit having a first end and a second end, the first end being arranged for pivotal movement about a hinge shaft that is substantially centered on that axis of the front and rear axes about which said pivotal bridge is pivotal, and the second end being arranged for pivotal movement around the projection, and
      at least one inner arm that connects said tie bar to said hinge shaft and is located in proximity to said drive unit,
      wherein the hinge shaft is shorter than the distance between the two side parts and at least one of (i) the hinge shaft does not contact the two side parts and (ii) the hinge shaft contacts one of the side parts, and wherein during actuation of said motor-driven drive unit said transverse tube is pivoted about said other axis.

2. The seat frame as defined claim 1, wherein the hinge shaft extends from one side arm to the at least one inner arm, and a free length of the hinge shaft is not substantially longer than at least one of (i) the corresponding length of the drive unit and (ii) about 5 cm.

3. The seat frame as defined in claim 1, wherein two inner arms are provided, the hinge shaft extends between said two inner arms and the clear distance between the two inner arms is not substantially greater than at least one of (i) the corresponding distance of the drive unit and (ii) about 5 cm.

4. The seat frame as defined in claim 1, wherein the hinge shaft, one of the inner arms, the tie bar and either an additional inner arm or a side arm form a supporting four-bar linkage for receiving the drive unit.

5. The seat frame as defined in claim 1, further comprising a seat pan and a height adjustment device for adjusting the height of the front edge of the seat pan, wherein the height adjustment device comprises the pivotal bridge and the tie bar.

6. The seat frame as defined in claim 1, further comprising a seat pan and a back rest, wherein the adjustment device is a height adjustment device for the seat pan or an incline adjustment device for the back rest.

7. The seat frame as defined in claim 1, wherein the adjustment device comprises a spindle that is inclined at an angle of less than about 20° relative to the side parts.

8. The seat frame as defined in claim 7, wherein the spindle is inclined at an angle of less than about 10° relative to the side parts.

9. The seat frame as defined in claim 1, wherein there is a free space between the hinge shaft and one of the two side parts.

10. The seat frame as defined in claim 1, further comprising at least one additional adjustment device.

11. The seat frame as defined in claim 10, wherein the at least one additional adjustment device includes a positional adjustment device.

12. A seat frame of a motor vehicle seat comprising:
a seat carrier having two side parts that are oriented transverse to a front axis and to a rear axis;
a back rest hinged to said side parts;
a pivotal bridge being pivotal about one of said front and rear axes, said bridge comprising a tie bar and two side arms; and
an adjustment device including
a motor-driven drive unit arranged for pivotal movement about a hinge shaft that is substantially centered on that axis of the front and rear axes about which said pivotal bridge is pivotal, and
two inner arms that connect said tie bar to said hinge shaft and are located in proximity to said drive unit, wherein said hinge shaft is shorter than the distance between the two seat parts and at least one of (i) the hinge shaft does not contact the two side parts and (ii) the hinge shaft contacts one of the side parts, and wherein an adjustment of the pivotal bridge does not have influence on the position of adjustment of the motor-driven drive unit relative to the pivotal bridge.

13. A seat frame of a motor vehicle seat comprising:
a seat carrier having two side parts that are oriented transverse to a front axis and to a rear axis;
a pivotal bridge being pivotal about one of said front and rear axes, said bridge comprising a tie bar and two side arms;
a transverse tube being arranged centrally with respect to the other one of said front and rear axes and is pivotal about said other axis;
at least one rear pivotal support being solidly connected to said transverse tube and comprising a projection; and
an adjustment device including
a motor-driven drive unit arranged for pivotal movement about a hinge shaft that is substantially centered on that axis of the front and rear axes about which said pivotal bridge is pivotal, said motor-driven drive unit being hinged to said projection, and
two inner arms that connect said tie bar to said hinge shaft and are located in proximity to said drive unit.

14. A seat frame of a motor vehicle seat comprising:
a seat carrier having two side parts that are oriented transverse to a front axis and to a rear axis;
a pivotal bridge being pivotal about one of said front and rear axes, said bridge comprising a tie bar and two side arms;
a transverse tube being arranged centrally with respect to the other axis of said front and rear axes and is pivotal about said other axis;
at least one rear arm, the transverse tube being solidly connected to the at least one rear arm;
a motor-driven drive unit having a first end and a second end, the first end being arranged for pivotal movement about a hinge shaft that is substantially centered on that axis of the front and rear axes about which said pivotal bridge is pivotal, and the second end being arranged for pivotal movement around the at least one rear arm; and
at least one inner arm that connects said tie bar to said hinge shaft and is located in proximity to said drive unit;
wherein said hinge shaft is shorter than the distance between the two seat parts, the hinge shaft does not contact the two side parts, and wherein during actuation of said motor-driven drive unit said transverse tube is pivoted about said other axis.

15. A motor car comprising a motor vehicle seat, said motor vehicle seat comprising:
a seat carrier including two side parts that are oriented transverse to a front axis and to a rear axis, a front part and a rear part;
a back rest hinged to said side parts,
a pivotal bridge being pivotal about one of said front and rear axes, said bridge comprising a tie bar and two side arms, said bridge further being one of i) pivotal about said front axis and comprising said front part and ii) pivotal about said rear axis and comprising said rear part;
a transverse tube being arranged centrally with respect to the other one of said front and rear axes and is pivotal about said other axis;
at least one pivotal support having a projection, the transverse tube being solidly connected to the at least one pivotal support; and
an adjustment device including
a motor-driven drive unit having a first end and a second end, the first end being arranged for pivotal movement about a hinge shaft that is substantially centered on that axis of the front and rear axes about which said pivotal bridge is pivotal, and the second end being arranged for pivotal movement around the projection, and
two inner arms that connect said tie bar to said hinge shaft and are located in proximity to said drive unit.

* * * * *